Figure 6:
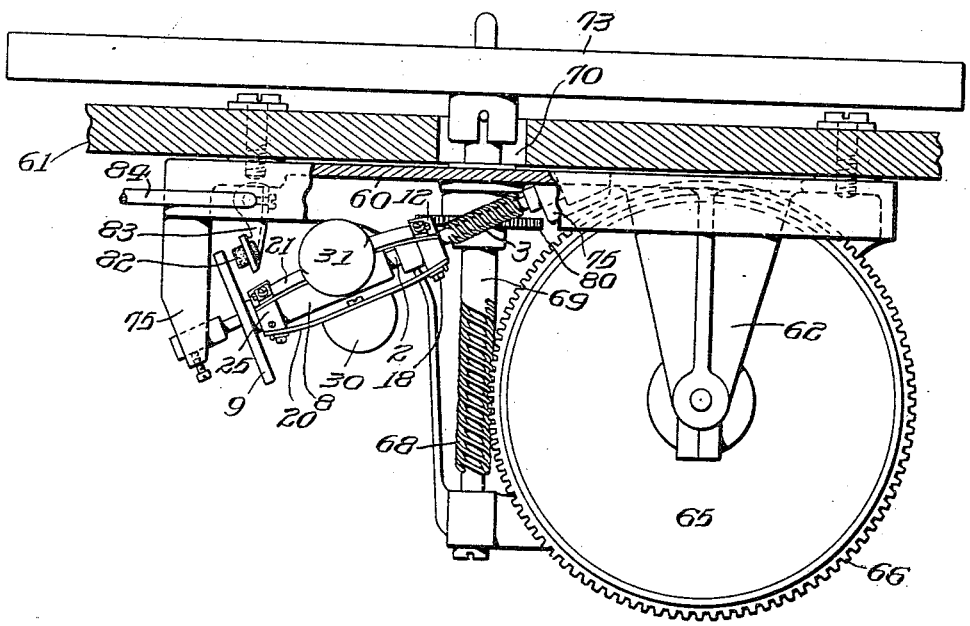

B. G. ROYAL.
GOVERNOR.
APPLICATION FILED JULY 6, 1915. RENEWED FEB. 24, 1916.
1,245,125.
Patented Oct. 30, 1917.
2 SHEETS—SHEET 1.
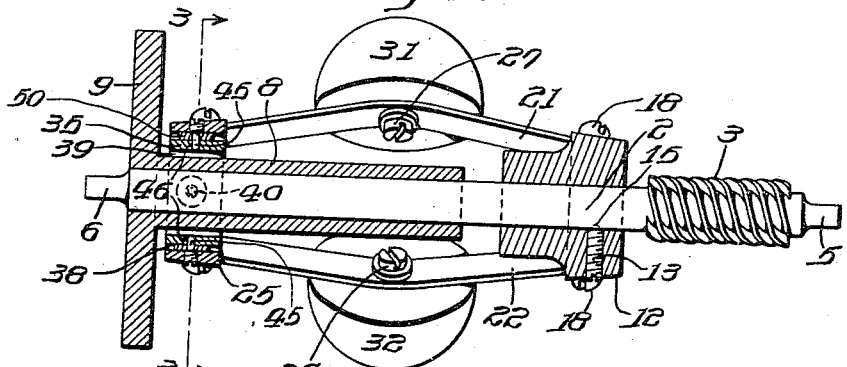
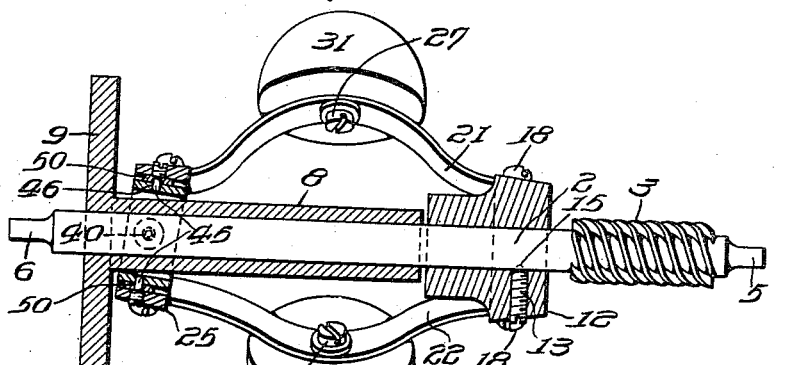
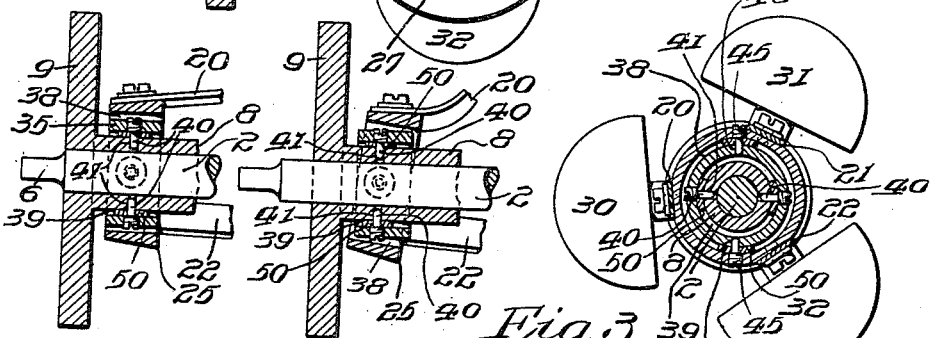
WITNESS
F. J. Hartman.
INVENTOR
Belford G. Royal.
BY Fenton & Blount
ATTORNEYS

UNITED STATES PATENT OFFICE.

BELFORD G. ROYAL, OF CAMDEN, NEW JERSEY, ASSIGNOR TO THE VICTOR TALKING MACHINE COMPANY, A CORPORATION OF NEW JERSEY.

GOVERNOR.

1,245,125.     Specification of Letters Patent.     Patented Oct. 30, 1917.

Application filed July 6, 1915, Serial No. 38,096. Renewed February 24, 1916. Serial No. 80,308.

*To all whom it may concern:*

Be it known that I, BELFORD G. ROYAL, a citizen of the United States, and a resident of Camden, county of Camden, and State of New Jersey, have invented certain new and useful Improvements in Governors, of which the following is a specification, reference being had to the accompanying drawings.

My improvements relate to governors of a type suitable for use in connection with light, high speed motors such as are frequently employed as actuating mechanism for talking machines and the like, and in which the greatest possible uniformity of speed is required. In order to obtain a governor of the class described which shall be capable of controlling the speed of the mechanism to which it is attached within the narrowest possible limits of variation, it is necessary to secure the most perfect uniformity in the weight and adjustment of the various parts, and while it may be possible to approximate this requirement when but a relatively small number of the devices are to be manufactured and where cost is not an object to be considered, nevertheless when the parts are manufactured in large quantities at a low cost it is almost impossible to secure the uniformity necessary to obtain the desired results.

The principal object of my invention therefore is to provide means whereby slight inaccuracies in the weight or adjustment of the various parts of governors of the class referred to, due to the necessary limitations arising by virtue of manufacturing requirements or from other causes, may be taken care of in such manner that the uniform speed of the rotation of the governor, and, in consequence, the speed of the motor, which it may be designed to control shall be maintained substantially constant. This result is obtained by so constructing the governor, especially the connection between the governing members and the movable member operated thereby, so that the force ultimately applied by each of the plurality of governing members on said movable member will move the member and at the same time neutralize the effect of any variations in the amount or direction of the pull actually produced by each individual governing member which would otherwise tend to move the movable member angularly with respect to its supporting member.

Further objects of my invention are to produce means for this purpose which shall be simple in construction, devoid of intricate parts, readily adaptable for use with governors of the types now ordinarily employed in mechanism of the class described and which may be constructed at a minimum cost.

My invention furthermore comprises all of the other various novel objects and features of construction and arrangement hereinafter more definitely specified.

In the accompanying drawings, Figure 1 is an enlarged longitudinal section through a governor embodying a preferred form of my invention in normal position and removed from its accompanying motor; Fig. 2 is a similar fragmentary view of a portion thereof, the device, however, having been rotated through an arc of 90 degrees from the position shown in Fig. 1, and Fig. 3 is a transverse section of the device taken on the line 3—3 in Fig. 1, looking in the direction of the arrows. In Fig. 4, which is a view corresponding to Fig. 1, the parts of the governor are shown when in operative position, the relation, however, between certain of the parts being exaggerated for the sake of clearness, and Fig. 5 is a fragmentary view, corresponding to Fig. 2, but also showing the parts in operative position, the relation of certain of the parts being similarly exaggerated for the sake of clearness. Fig. 6 is a fragmentary side elevation of a talking machine motor of well-known form, and embodying a governor constructed in accordance with my invention.

Referring now more especially to Figs. 1 to 5 inclusive, that embodiment of my invention illustrated therein may comprise a main governor shaft 2, provided adjacent at one end with an integral worm 3, or other suitable means whereby the shaft may be rotated through a suitable connection with the actuating mechanism of the motor proper to which the governor may be attached, for instance, in the manner shown in Fig 6 hereinafter more specifically referred to. The ends 5 and 6 of the shaft are preferably reduced in diameter for engagement in suitable bearings, not shown, and affording support to the shaft to permit of its free rotative movement. Surrounding the shaft at the opposite end thereof from that carrying the worm 3 and rotatable thereon, is a longitudinally extending sleeve 8, having adjacent its outer end a preferably annular friction disk 9, which may be formed integral with the sleeve, as shown, or separately therefrom and rigidly operatively affixed thereto by any suitable means.

Substantially midway between the inner end of the sleeve and the inner end of the worm, an annular collar 12 may be rigidly secured to the shaft by any suitable means as by the set screw 13 extending through the collar and into a depression 15 formed in the surface of the shaft, while equidistantly spaced about the periphery of the collar and with their ends rigidy secured thereto in any suitable manner, as for instance, by the screws 18 engaging in suitable threaded apertures in the collar, are a plurality of flexible members 20, 21, 22, which in practice may consist of suitable flat springs, the other ends of which are similarly rigidly attached to a ring 25 located adjacent the outer end of the sleeve 8. The springs 20, 21 and 22 may preferably be bowed outwardly toward their centers to normally approximate a slightly elliptical form as best shown in Fig. 1, and provided with suitable apertures midway of the free portions of the springs for the passage of the screws 27 serving to secure the weights 30, 31 and 32 in fixed relation with the springs. While in the drawings I have illustrated a governor having but three springs 20, 21 and 22, with corresponding weights 30, 31 and 32, it will be evident that any desired number of springs, from two upward, together with corresponding weights may be employed, and that when but two springs are utilized they will be positioned in diametrically opposite relation on either side of the collar 12 and ring 25, and that when more than two are employed they will be positioned as shown in the drawing at points equidistantly spaced about the periphery of the collar and ring.

Instead of rigidly affixing the ends of the springs 20, 21 and 22 directly to the sleeve or other corresponding member as has been customary in the forms of governors generally used prior to my invention, I prefer to attach the ends of the springs adjacent the outer end of sleeve 8 to the substantially flat ring 25, as hereinbefore described, which surrounds the sleeve and is of considerably greater diameter than the exterior diameter thereof. Between this ring and the sleeve and normally concentric but out of contact with both, I locate a second ring 35 of a size sufficient to leave a slight space 38 between its exterior and the interior of ring 25, and a similar space 39 between its interior and the exterior of sleeve 8 to which it is attached by means of a pair of diametrically opposed pivots 40, threaded through the ring and projecting into suitable apertures 41 in the sleeve. In a similar manner the ring 25 is pivoted to the ring 35 by a pair of diametrically opposed pivots 45 threaded into ring 25 and entering suitable apertures 46 in ring 35, this pair of pivots being located at right angles to pivots 40 so that a universal connection is provided between the members 20, 21 and 22 attached to the outer face of ring 25 and sleeve 8. For the purpose of taking up any lost motion between the concentric rings and the sleeve, I prefer to provide a plurality of washers 50 of leather or other similar slightly resilient material, surrounding the pivots and located between the adjacent faces of the various concentric parts.

In Fig. 6 a governor embodying the features of the preferred form of my invention is shown in connection with a spring motor of the type frequently used in talking machines and which comprises the frame 60 suspended from the motor-board 61, and having downwardly depending brackets 62 supporting the spring barrel 65 provided with suitable peripheral gearing 66 meshing with a worm 68 upon the main shaft 69 of the motor, which passes through a suitable aperture 70 in the motor-board and serves to support and rotate a turntable 73 suitable for the reception of a talking machine record, not shown. The main governor shaft 2 is supported in suitable bearings 75, and rotated from the main shaft 69 by engagement of suitable gearing 80 thereon with worm 3, such rotation tending to cause the weights 30, 31 and 32 to move outwardly and draw the friction disk 9 longitudinally of the shaft against the friction pads 82 adjustably supported by a suitable bracket 83 controlled by a rod 84 in the well-known manner, an increased pressure between the pads and the disk serving to increase the load upon the motor.

When the governor is in normal position as shown in Figs. 1, 4 and 6, and an equal pull or no pull at all exerted by the springs upon the rings 25, the outer surface of sleeve 8 and the inner surfaces of the two rings will be maintained parallel to the longitudinal axis of the sleeve, but when the governor is rotated and one of the weights under the action of centrifugal force tends to move farther from the center than the other weights, due perhaps to its slightly greater mass or to a variation in the temper or tension of the spring to which it is attached from that of the other springs, the universal connection formed by means of the rings and pivots will yield in such manner, as shown on a greatly enlarged scale in Figs. 2 and 4, that the longitudinal pull upon the sleeve 8 ultimately applied by each individual governing member on the movable member 9 will be in a direction substantially parallel to the axis of the shaft and the sleeve will be moved along the shaft without undue friction or binding between the parts, thus carrying the friction disk evenly against the braking member without any jerking or intermittent movement, and tending to secure the greatest possible uniformity of rotation of the governor and in consequence of the mechanism which the governor is arranged to control.

It will thus be evident that in a governor constructed in accordance with my invention any irregularities in the pull exerted upon the sliding sleeve and thence to the friction disk due to variation in the weight of the governor balls, or temper or tension of the springs on which they are supported, will be automatically taken care of by the action of the universal connection between the springs and the sleeve, so that the pull ultimately applied to the sleeve by the individual governing members will not be greater at a point of the sleeve where one of the springs is attached than at the points where any of the other springs are attached, thereby tending to cause the sleeve to bind in its travel upon the main shaft and to be irregularly pressed against the friction pads, but that on the contrary, the pull upon the sleeve will be so exerted as to move the sleeve upon the shaft without binding, so that the disk will be pressed steadily against the friction pads, whereby the greatest possible uniformity in the speed of rotation of the governor, and hence in the mechanism to which it may be attached is obtained.

While I have herein described a preferred form of my invention in considerable detail and have illustrated it as applied to the governor of a spring motor suitable for a talking machine. I do not thereby intend to limit myself specifically thereto as it will be evident that my improved form of governor may be applied to other types of motors or other actuating mechanisms as may be desired, and furthermore, that various changes may be made in the construction and arrangement of the details of the device itself to adapt it to the varying conditions encountered in practice without departing from the spirit and scope of the invention as defined in the appended claims.

Having thus described my invention, I claim and desire to protect by Letters Patent of the United States:

1. In a governor, the combination of a main shaft, a sleeve slidable on said shaft, a plurality of outwardly movable members, and a universal connection between said members and said sleeve.

2. In a governor, the combination of a main shaft, a sleeve longitudinally slidable on said shaft, a plurality of outwardly movable members each having an end secured in fixed relation with said shaft, and a universal connection between the other ends of said members and said sleeve.

3. In a governor, the combination with a main shaft, of a sleeve slidable on said shaft, a plurality of springs carrying outwardly movable weights, one end of each of said springs being maintained in fixed relation with said shaft, and a universal connection comprising a plurality of concentric rings between the other ends of said springs and said sleeve.

4. In a governor, the combination of a main shaft, a sleeve slidable on said shaft and carrying a friction disk, a collar rigidly secured to said sleeve, a plurality of springs each having one of its ends maintained in fixed relation with said collar, a weight on each of said springs, and a universal connection comprising a plurality of concentric pivoted rings between the other ends of said springs and said sleeve.

5. In a governor, the combination of a shaft, a sleeve slidable on said shaft, flexible members connected at one end to said shaft, and means connecting the other ends of said members with said sleeve, said means being operative to neutralize the effect of any unequal pull exerted on said shaft by said members when flexed outwardly.

6. In a governor, the combination with a shaft, of a sleeve slidable on said shaft, a plurality of weights, members secured to said weights and adapted to flex outwardly under the action of said weights when said shaft is rotated, and means connecting said members with said sleeve and adapted to neutralize the effect of any unequal pull upon said sleeve exerted by said members under the action of said weights.

7. In a governor, the combination with a shaft, of a sleeve slidable on said shaft, a plurality of flexible members, and means comprising a plurality of concentric pivoted rings interposed between said members and said sleeve, adapted to neutralize the effect of any unequal pull exerted on said sleeve by said members when flexed outwardly.

8. In a governor, the combination of a shaft, a sleeve slidable on said shaft, a ring surrounding said sleeve and pivoted thereto, a second ring concentric with and surrounding said first-mentioned ring and pivoted thereto on an axis normal the pivotal axis of said first-mentioned ring, and a plurality of flexible members each having its ends maintained respectively in fixed relation with said shaft and with said last mentioned ring.

9. In a governor, the combination of a shaft, governing members rotated thereby, a member actuated by said governing members, and a universal connection between said governing members and said actuated member.

10. In a governor, the combination of a shaft, governing members each having an end in fixed relation with said shaft, a member actuated by said governing members, and a universal connection between the other ends of said governing members and said actuated member.

11. In a governor, the combination of a shaft, a member in longitudinally movable relation with said shaft, a plurality of outwardly movable members and a universal connection between said last mentioned members and said first mentioned member.

12. In a governor, the combination of a shaft, a plurality of governing members and a movable member located on the shaft and operated by the governing members and so connected thereto as to permit any variations in the amount or direction of pull exerted by each governing member on the movable member to operate without increasing the friction between the movable member and the shaft.

13. In a governor, the combination of a shaft, a plurality of governing members and a movable member operated thereby and so connected thereto as to permit the pull ultimately applied by said governing members on said movable member to operate in a substantially uniform amount and direction regardless of any inequalities in the actual force produced by each governing member.

14. In a governor, the combination with a shaft, a plurality of governing members, a movable member located on said shaft and a connection between the governing members and the movable member so arranged as to permit any variations in the amount or direction of pull exerted by the individual governing members to operate the movable member without increasing the friction between the movable member and shaft.

15. In a governor, a plurality of governing members and a movable member connected to said governing members by universally movable connection.

16. In a governor, a plurality of governing members, means to rotate said members, and a movable member actuated by said governing members connected thereto by a universal connection.

In witness whereof, I have hereunto set my hand this 30th day of June, 1915.

BELFORD G. ROYAL.